United States Patent [19]

Schwindeman et al.

[11] Patent Number: 5,965,681
[45] Date of Patent: Oct. 12, 1999

[54] PROTECTED FUNCTIONALIZED TELECHELIC POLYMERS AND PROCESSES FOR MAKING THE SAME

[75] Inventors: James Anthony Schwindeman, Lincolnton, N.C.; Roderic Paul Quirk, Akron, Ohio; Conrad William Kamienski, deceased, late of Gastonia, N.C., by Diane Buschke Kamienski, executrix

[73] Assignee: FMC Corporation, Philadelphia, Pa.

[21] Appl. No.: 09/107,678

[22] Filed: Jun. 30, 1998

Related U.S. Application Data

[63] Continuation-in-part of application No. 08/873,220, Jun. 11, 1997.
[60] Provisional application No. 60/019,995, Jun. 18, 1996.

[51] Int. Cl.⁶ ............................... C08F 36/00; C08F 4/06
[52] U.S. Cl. .................. 526/335; 526/65; 526/66; 526/75; 526/78; 526/89; 526/123; 526/288; 526/296; 526/337; 526/340; 522/113; 522/184; 524/777
[58] Field of Search ................... 526/65, 66, 75, 526/78, 89, 123, 296, 337, 340, 288; 522/113, 184; 524/777

[56] References Cited

U.S. PATENT DOCUMENTS

| | | |
|---|---|---|
| 3,280,084 | 10/1966 | Zelinski et al. |
| 3,326,881 | 6/1967 | Uraneck et al. |
| 3,629,172 | 12/1971 | Jones |
| 3,639,517 | 2/1972 | Kitchen et al. |
| 3,719,730 | 3/1973 | Hansley et al. |
| 3,776,964 | 12/1973 | Morrison et al. |
| 3,842,143 | 10/1974 | Milkovich et al. |
| 3,862,100 | 1/1975 | Halasa et al. |
| 3,954,894 | 5/1976 | Kamienski et al. |
| 3,956,232 | 5/1976 | Uraneck et al. |
| 3,985,830 | 10/1976 | Fetters et al. |
| 4,039,593 | 8/1977 | Kamienski et al. |
| 4,052,370 | 10/1977 | Halasa et al. |
| 4,753,991 | 6/1988 | Bronstert |
| 4,994,526 | 2/1991 | Peters |
| 5,166,277 | 11/1992 | Goodwin et al. |
| 5,310,490 | 5/1994 | Struglinski et al. |
| 5,310,814 | 5/1994 | Struglinski et al. |
| 5,321,148 | 6/1994 | Schwindeman |
| 5,331,058 | 7/1994 | Shepherd et al. |
| 5,336,726 | 8/1994 | DuBois |
| 5,362,699 | 11/1994 | Shepherd et al. |
| 5,376,745 | 12/1994 | Handlin, Jr. et al. |
| 5,391,663 | 2/1995 | Bening et al. |
| 5,393,843 | 2/1995 | Handlin, Jr. et al. |
| 5,405,911 | 4/1995 | Handlin, Jr. et al. |
| 5,416,168 | 5/1995 | Willis et al. |
| 5,478,899 | 12/1995 | Bening |
| 5,486,568 | 1/1996 | Bening et al. |
| 5,502,131 | 3/1996 | Antkowiak et al. |
| 5,521,255 | 5/1996 | Roy |
| 5,565,526 | 10/1996 | Schwindeman et al. |
| 5,567,774 | 10/1996 | Schwindeman et al. |

FOREIGN PATENT DOCUMENTS

| | | |
|---|---|---|
| 0 189 672 | 8/1986 | European Pat. Off. |
| 0 593 049 | 4/1994 | European Pat. Off. |
| 0 632 075 A2 | 1/1995 | European Pat. Off. |
| 2 118 952 | 11/1983 | United Kingdom |
| 2 241 239 | 8/1991 | United Kingdom |
| 2 270 317 | 3/1994 | United Kingdom |
| WO 91/12277 | 8/1991 | WIPO |
| WO 93/04094 | 3/1993 | WIPO |
| WO 95/22566 | 8/1995 | WIPO |
| WO 97/16465 | 5/1997 | WIPO |

OTHER PUBLICATIONS

D.N. Schulz et al., J. Poly. Sci. Polymer Chem. Ed. 12, 153–166 (1974).
M. Gardette et al., Tetrahedron 41, 5887–5899 (1985).
J. Almena, Tetrahedron 51, 11883–11890 (1995).
A.J. Dias et al., Rubber & Plastics News, pp. 18–20 (Oct. 31,1988).
A.J. Dias et al., *Macromolecules* 20, 2068–2076 (1987).
L. Weber, "Functionalization of Living Polymers–Results and Problems, " *Makromol. Chem., Macromol. Symp.* 3, 317–329 (1986).

*Primary Examiner*—Samuel A. Acquah
*Attorney, Agent, or Firm*—Alson & Bird LLP

[57] ABSTRACT

Protected, functionalized telechelic polymers, hydrogenated and/or deprotected analogues thereof, and processes to prepare these polymers are disclosed. In the invention, a lithium initiator is added to a compound having at least two independently polymerizable vinyl groups to form a dilithium initiator. Monomer is then added to grow or polymerize polymer arms having living ends and the living ends functionalized.

22 Claims, No Drawings

PROTECTED FUNCTIONALIZED TELECHELIC POLYMERS AND PROCESSES FOR MAKING THE SAME

CROSS REFERENCE TO RELATED APPLICATION

This application is related to commonly owned copending provisional application Ser. No. 60/019,995, filed Jun. 18, 1996, and claims the benefit of its earlier filing date under 35 U.S.C. 119(e), and is a continuation-in-part application of application Ser. No. 08/873,220, filed Jun. 11, 1997.

FIELD OF THE INVENTION

This invention relates generally to telechelic polymers and processes for making the same, and more particularly to telechelic polymers having protected functional groups.

BACKGROUND OF THE INVENTION

Telechelic polymers have found utility in making adhesives, sealants, coatings, films and fibers. These polymers have typically been prepared from a dilithium initiator. See, for example, U.S. Pat. Nos. 5,393,843 and 5,405,911. For example, reaction of two equivalents of an alkyllithium reagent, such as sec-butyllithium, with a compound having at least two independently polymerized vinyl groups, such as isomeric divinylbenzenes or isomeric diisopropenylbenzenes, generates a dilithium initiator. Addition of an anionically polymerizable monomer, such as 1,3-butadiene, isoprene, or styrene, affords a polymer chain, with living anions on each of the two termini. This dianion can then be quenched with various functionalizing agents, to afford a telechelic polymer. However, these functionalization reactions are often inefficient, due to the formation of physical gelation phenomena that produce severe mixing problems (see L. Weber, Makromol. Chem., Macromol. Symp., 3, 317 (1986) and U.S. Pat. Nos. 5,393,843 and 5,478,899).

SUMMARY OF THE INVENTION

This invention provides telechelic functional polydiene polymers, polyarylene polymers and polydiene/polyarylene copolymers, their hydrogenated analogues, and processes for preparing the same. In contrast to telechelic polymers of the prior art, the molecular architecture of compounds of the present invention can be precisely controlled. High functionalization of the living polymer dianions can also be achieved, as the functionalizing agents of the current invention do not cause gelation to occur upon addition to a living polymer. Further, the nature of the functional group and its protecting group can be varied, simply by changing the functionalizing agent.

The present invention also provides processes for preparing the polymers of the invention, which can provide efficient functionalization of the living polymer anions.

DETAILED DESCRIPTION OF THE INVENTION

The telechelically functional polymers of the present invention can be defined as follows:

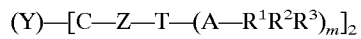

wherein:

Y represents a core derived by incorporation of at least one molecule or mixtures of molecules having at least two independently polymerized vinyl groups, such as 1,3-divinylbenzene or 1,4-divinylbenzene;

C is a hydrogenated or unsaturated block derived by anionic polymerization of at least one monomer selected from the group consisting of conjugated dienes, alkenylsubstituted aromatics, and mixtures thereof;

Z is a branched or straight chain hydrocarbon connecting group which contains 1–25 carbon atoms;

T is selected from oxygen, sulfur, or nitrogen;

$(A-R^1R^2R^3)_m$ is a protecting group, in which A is an element selected from Group IVa of the Periodic Table of the Elements; and $R^1$, $R^2$, and $R^3$ are independently defined as hydrogen, C1–C25 alkyl, substituted C1–C25 alkyl groups containing lower C1–C10 alkyl, lower alkylthio, and lower dialkylamino groups, C3–C25 aryl or substituted C3–C25 aryl groups containing lower C1–C10 alkyl, lower alkylthio, lower dialkylamino groups, or C3–C12 cycloalkyl and substituted cycloalkyl groups containing 5 to 12 carbon atoms, and m is 1 when T is oxygen or sulfur, and 2 when T is nitrogen.

Conjugated diene and alkenylsubstituted aromatic hydrocarbons to be anionically polymerized are chosen from the group of unsaturated organic compounds that can be polymerized anionically (i.e. in a reaction initiated by an organoalkali metal). Examples of suitable conjugated diene hydrocarbons include, but are not limited to, 1,3-butadiene, isoprene, 2,3-dimethyl-1,3-butadiene, 1,3-pentadiene, myrcene, 2-methyl-3ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene.

Examples of polymerizable alkenylsubstituted aromatic hydrocarbons include, but are not limited to, styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene and mixtures of these, as well as alkyl, cycloalkyl, aryl, alkylaryl and arylalkyl derivatives thereof in which the total number of carbon atoms in the combined hydrocarbon constituents is generally not greater than 18. Examples of these latter compounds include 3-methylstyrene, 3,5-diethylstyrene, 4-tert-butylstyrene, 2-ethyl-4-benzylstyrene, 4-phenylstyrene, 4-p-tolylstyrene, 2,4-divinyltoluene and 4,5-dimethyl-1-vinylnaphthalene. U.S. Pat. No. 3,377,404, incorporated herein by reference in its entirety, discloses suitable additional alkenylsubstituted aromatic compounds.

The polymers of the invention can be optionally hydrogenated. The protecting groups can also be optionally removed, prior to or following hydrogenation. Removal of the protecting group(s) (deprotection) produces polymers with at least one functional group (e.g. oxygen, sulfur and/or nitrogen) per polymer chain on the ends of the polymer arms. The functional groups can then participate in various copolymerization reactions by reaction of the functional groups on the ends of the polymer arms with selected difunctional or polyfunctional comonomers.

After deprotection, the polymer has the following structure:

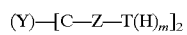

wherein:

Y represents a core derived by incorporation of at least one molecule or a mixture of molecules having at least two independently polymerized vinyl groups, such as 1,3-divinylbenzene or 1,4-divinylbenzene;

C is a hydrogenated or unsaturated block derived by anionic polymerization of at least one monomer selected from the group consisting of conjugated dienes, alkenylsubstituted aromatics, and mixtures thereof; and Z, T, and m are defined as above.

In one preferred embodiment of the invention, each C block is hydrogenated 1,3-butadiene having a peak molecular weight from 500 to 50,000, and the 1,2-polymerization of the hydrogenated butadiene is between 40% and 60%. In another embodiment of the invention, each C block is hydrogenated isoprene having a peak molecular weight from 500 to 50,000.

Advantages of the telechelic polymers produced by the present invention include highly efficient functionalization of the living anion sites on the arms of the polymer. In addition, various protected functional groups can be introduced. Further, the polymers of the invention can be less expensive to produce than alternative methods to prepare telechelic polymers.

The present invention also provides processes for producing the polymers described above. The process of the invention includes the following steps:

adding two (2) equivalents of at least one lithium initiator or a mixture of lithium initiators, such as sec-butyllithium, to at least one or a mixture of compounds having at least two independently polymerizable vinyl groups, such as 1,3-divinylbenzene or 1,3-diisopropenylbenzene, to form a dilithium initiator having a central core formed of the compounds(s) having polymerizable vinyl groups;

adding at least one monomer selected from the group consisting of conjugated dienes, alkenylsubstituted aromatics, and mixtures thereof, to grow or polymerize polymer arms having living ends from the central core; and adding two equivalents of at least one or a mixture of functionalizing agents (electrophiles) having the following structure:

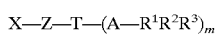

wherein:

X is halogen selected from chloride, bromide and iodide; and

Z, T, A, $R^1$, $R^2$, $R^3$, and m are as defined above, to form a polymer as described above having protected functional groups at the terminus (or end distal from the core) of the arms. The resultant functionalized polymer can then be recovered using conventional techniques.

The monomers can be polymerized singly, sequentially or as a mixture thereof in an inert solvent, preferably a nonpolar solvent, optionally containing an ethereal modifier, at a temperature of about −30° C. to about 150° C.

The functionalizing agents, or electrophiles, can be prepared as described, for example, in International Publication WO 97/16465, the entire disclosure of which is incorporated by reference. In addition, the electrophiles can be prepared as described in K. Ueda, A. Hirao, and S. Nakahama, Macromolecules, 23, 939 (1990); U.S. Pat. No. 5,496,940; U.S. Pat. No. 5,600,021; U.S. Pat. No. 5,362,699; A. Alexakis, M. Gardette, and S. Colin, Tetrahedron Letters, 29, 1988, 2951; B. Figadere, X. Franck, and A. Cave, Tetrahedron Letters, 34, 1993, 5893; J. Almena, F. Foubelo, and M. Yus, Tetrahedron, 51, 1995, 11883; D. F. Taber and Y. Wang, J. Org. Chem., 58, 1993, 6470; F. D. Toste and I. W. J. Still, Synlett, 1995, 159; and U.S. Pat. No. 5,493,044. The functionalizing step can be conducted at temperatures ranging from about −30° C. to about 150° C.

As noted above, if desired, the protecting groups can be removed from the polymers. Deprotection can be performed either prior to or after the optional hydrogenation of the residual unsaturation. For example, to remove tert-alkyl-protected groups, the protected polymer can be mixed with Amberlyst® 15 ion exchange resin and heated at an elevated temperature, for example 150° C., until deprotection is complete. Tert-alkyl-protected groups can also be removed by reaction of the polymer with para-toluensulfonic acid, trifluoroacetic acid, or trimethylsilyliodide. Additional methods of deprotection of the tert-alkyl protecting groups can be found in T. W. Greene and P. G. M. Wuts, Protective Groups in Organic Synthesis, Second Edition, Wiley, New York, 1991, page 41.

Tert-butyldimethylsilyl protecting groups can be removed by treatment of the copolymer with acid, such as hydrochloric acid, acetic acid, paratoluensulfonic acid, or Dowex® 50W-X8. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80–83.

The progress of the deprotection reactions can be monitored by conventional analytical techniques, such as Thin Layer Chromatography (TLC), Nuclear Magnetic Resonance (NMR) spectroscopy, or InfraRed (IR) spectroscopy.

Examples of methods to hydrogenate the polymers of this invention are described in U.S. Pat. Nos. 4,970,254, 5,166,277, 5,393,843 and 5,496,898, the entire disclosure of each of which is incorporated by reference. The hydrogenation of the polymer is conducted in situ, or in a suitable solvent, such as hexane, cyclohexane or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by Infra-Red (IR) spectroscopy or Nuclear Magnetic Resonance (NMR) spectroscopy. The hydrogenation reaction can be conducted until at least 90% of the aliphatic unsaturation has been saturated. The hydrogenated polymer is then recovered by conventional procedures, such as removal of the catalyst with aqueous acid wash, followed by solvent removal or precipitation of the polymer.

The polymerization solvent can be an inert solvent such as a hydrocarbon. Solvents useful in practicing this invention include, but are not limited to, inert liquid alkanes, cycloalkanes and aromatic solvents such as alkanes and cycloalkanes containing five to ten carbon atoms, such as pentane, hexane, cyclohexane, methylcyclohexane, heptane, methylcycloheptane, octane, decane and the like, and aromatic solvents containing six to ten carbon atoms such as toluene, ethylbenzene, p-xylene, m-xylene, o-xylene, n-propylbenzene, isopropylbenzene, n-butylbenzene, and the like.

Polar solvents can also be used, including, but not limited to, diethyl ether, dibutyl ether, tetrahydrofuran, 2-methyltetrahydrofuran, methyl tert-butyl ether, diazabicyclo[2.2.2]octane, triethylamine, tributylamine, N,N,N',N'-tetramethylethylene diamine (TMEDA), and 1,2- dimethoxyethane (glyme). Polar solvents (modifiers) can also be added to the polymerization reaction to alter the microstructure of the resulting polymer or to promote functionalization or randomization. The amount of the polar modifier added depends on the vinyl content desired, the nature of the monomer, the temperature of the polymerization, and the identity of the polar modifier.

Exemplary compounds having at least two independently polymerizable vinyl groups include isomeric (mixtures of ortho, meta and para) dialkenylaryls and isomeric di- and trivinylaryls, such as 1,2-divinylbenzene, 1,3-divinylbenzene, 1,4-divinylbenzene, 1,2,4-trivinylbenzenes, 1,3-divinylnaphthalenes, 1,8-divinylnaphthalene, 1,2-diisopropenylbenzene, 1,3-diisopropenylbenzene, 1,4-diisopropenylbenzene, 1,3,5-trivinylnaphthalene, and other suitable materials known in the art to be useful for coupling polymers, as well as mixtures thereof. See also U.S. Pat. Nos. 3,639,517 and 5,489,649, and R. P. Zelinski et al in J.Polym.Sci., A3, 93, (1965) for these and additional compounds. Mixtures of these compounds can also be used. The process is described, for example, in U.S. Pat. No. 4,409,357 and by L. J. Fetters in Macromolecules, 9,732 (1976).

Exemplary lithium initiators include those represented by the formula RLi, wherein R represents an aliphatic, cycloaliphatic, or aromatic radical. Such initiators include, but are not limited to, n-butyllithium, sec-butyllithium, tert-butyllithium, and the like, and mixtures thereof.

This procedure efficiently functionalizes each living anion site of the polymer with a protected functional group. The nature of the protected functional group can be varied by merely changing the identity of the electrophile.

The present invention will be further illustrated by the following non-limiting examples.

EXAMPLE 1

A functionalized linear polymer having the formula

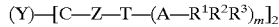

wherein C is a polybutadiene and Y is a divinylbenzene core is synthesized as follows. Cyclohexane (100 pounds), diethyl ether (6 pounds), and m-diisopropenylbenzene (DIPB, 1564 grams, 97 wt % DIPB, 9.6 moles) are combined with stirring in a sealed, steel reactor vessel under an inert nitrogen atmosphere. Impurities that might interfere with anionic polymerization are removed by titration with a solution of sec-butyllithium in cyclohexane (0.09 g of sec-BuLi/ml). The purified solution is then treated with 2 equivalents of sec-BuLi (23.5 pounds of sec-BuLi solution, 19 moles) for each equivalent of DIPB that is present. The diinitiator is formed in solution by reaction at 50° C. for about 30 minutes.

In a separate vessel, cyclohexane (162 pounds), diethyl ether (15 pounds), and polymerization grade 1,3-butadiene (42 pounds) are combined under a nitrogen atmosphere at 20° C. Impurities that might interfere with anionic polymerization are removed by titration with a solution of sec-butyllithium in cyclohexane (0.09 g of sec-BuLi/ml). The purified solution of monomer is transferred to the vessel containing the diinitiator and the polymerization ensues. The polymerization exotherm is controlled by cooling the reactor to keep the temperature of the reaction mixture below 50° C. The polymerization reaction is essentially complete after about 30 minutes.

The solution containing the diinitiated polymer is treated at 50° C. with 3-(tertbutyldimethylsilyloxy)-1-chloropropane (35.4 pounds, 77 moles) to functionalize the chain ends as a protected alcohol. The reaction is allowed to proceed for about 3 hours. The product functionalized linear polymer is worked up in the usual fashion.

For deprotection, a sample of the functionalized linear polymer (0.001 moles) is dissolved in tetrahydrofuran (10 ml). Aqueous hydrochloric acid (1 ml, 0.5 N, 2.5 equivalents) is added. The solution is heated to reflux for 12 hours. The deprotected linear polymer is precipitated in methanol. The solvent is evaporated under reduced pressure to give hydroxy-terminated linear polymer. Complete deprotection is determined by $^1$H NMR analysis (loss of tert-butyldimethylsilyloxy signals).

EXAMPLE 2

A functionalized linear polymer is made in a similar fashion to the polymer in Example 1 except that living anion sites of the linear polymer are functionalized by the addition of 3-(tert-butoxy)-1-chloropropane.

For deprotection, a sample of the functionalized linear polymer (0.001 mole) and Amberlyst 15 ion exchange resin (1.5 g, ground powder, Aldrich) are combined in cyclohexane (10 ml). The mixture is heated to reflux for 6 hours and monitored by thin layer chromatography (TLC). The product solution is filtered to remove the amberlyst resin. The polymer is precipitated in methanol. The solvent is evaporated under reduced pressure to give hydroxy-terminated linear polymer. Complete deprotection is determined by $^1$H NMR analysis (loss of tert-butoxy signal).

The foregoing examples are illustrative of the present invention and are not to be construed as limiting thereof.

That which is claimed is:

1. A telechelic polymer comprising the structure:

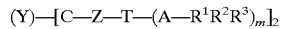

wherein:

Y represents a core derived by incorporation of at least one molecule or a mixture of molecules having at least two independently polymerized vinyl groups;

C is a hydrogenated or unsaturated block derived by anionic polymerization of at least one monomer selected from the group consisting of conjugated dienes, alkenylsubstituted aromatics, and mixtures thereof;

Z is a branched or straight chain hydrocarbon connecting group which contains 1–25 carbon atoms;

T is oxygen, sulfur, or nitrogen;

$(A-R^1R^2R^3)_m$ is a protecting group in which A is an element selected from Group IVa of the Periodic Table of the Elements; $R^1$, $R^2$, and $R^3$ are independently defined as hydrogen, C1–C25 alkyl, substituted C1–C25 alkyl groups containing lower C1–C10 alkyl, lower alkylthio, and lower dialkylamino groups, C3–C25 aryl or substituted C3–C25 aryl groups containing lower C1–C10 alkyl, lower alkylthio, lower dialkylamino groups, or C3–C12 cycloalkyl and substituted cycloalkyl groups containing 5 to 12 carbon atoms, and m is 1 when T is oxygen or sulfur, and 2 when T is nitrogen.

2. The polymer of claim 1, wherein each C block is hydrogenated 1,3-butadiene having a peak molecular weight from 500 to 50,000.

3. The polymer of claim 2, wherein each C block is at least 90% hydrogenated.

4. The polymer of claim 3, wherein the 1,2-polymerization of the hydrogenated butadiene is between 40% and 60%.

5. The polymer of claim 1, wherein each C block is hydrogenated isoprene having a peak molecular weight from 500 to 50,000.

6. The polymer of claim 5, wherein each C block is at least 90% hydrogenated.

7. The polymer of claim 1, wherein Y is derived by incorporation of at least one compound selected from the group consisting of isomeric dialkenylaryls, isomeric di- and trivinylaryls and mixtures thereof.

8. A telechelic polymer comprising the structure:

(Y)—[C—Z—T(H)$_m$]$_2$ wherein:

Y represents a core derived by incorporation of at least one molecule or mixture of molecules having at least two independently polymerizable vinyl groups;

C is a hydrogenated or unsaturated block derived by anionic polymerization of a monomer selected from the group consisting of conjugated dienes, alkenylsubstituted aromatics, and mixtures thereof;

Z is a branched or straight chain hydrocarbon connecting group which contains 1–25 carbon atoms;

T is oxygen, sulfur, or nitrogen; and m is 1 when T is oxygen or sulfur, and 2 when T is nitrogen.

9. The polymer of claim 8, wherein each C block is hydrogenated 1,3-butadiene having a peak molecular weight from 500 to 50,000.

10. The polymer of claim 9, wherein each C block is at least 90% hydrogenated.

11. The polymer of claim 10, wherein the 1,2-polymerization of the hydrogenated butadiene is between 40% and 60%.

12. The polymer of claim 8, wherein each C block is hydrogenated isoprene having a peak molecular weight from 500 to 50,000.

13. The polymer of claim 12, wherein each C block is at least 90% hydrogenated.

14. A process for making functionalized polymers, comprising:

adding two equivalents of at least one lithium initiator or a mixture thereof to at least one molecule or a mixture of molecules having at least two independently polymerizable vinyl groups to provide a dilithium initiator having a central core formed of the compound having polymerizable vinyl groups;

adding at least one monomer selected from the group consisting of a conjugated dienes, alkenylsubstituted aromatics, and mixtures thereof, to grow arms having living ends from the central core; and adding two equivalents of at least one or a mixture thereof of a functionalizing agent having the following structure:

X—Z—T—(A—R$^1$R$^2$R$^3$)$_m$ wherein:

X is halogen selected from chloride, bromide and iodide;

Z is a branched or straight chain hydrocarbon connecting group which contains 1–25 carbon atoms;

T is oxygen, sulfur, or nitrogen; and (A—R$^1$R$^2$R$^3$)$_m$ is a protecting group in which A is an element selected from Group IVa of the Periodic Table of the Elements; R$^1$, R$^2$, and R$^3$ are independently defined as hydrogen, C1–C25 alkyl, substituted C1–C25 alkyl groups containing lower C1–C10 alkyl, lower alkylthio, and lower dialkylamino groups, C3–C25 aryl or substituted C3–C25 aryl groups containing lower C1–C10 alkyl, lower alkylthio, lower dialkylamino groups, or C3–C12 cycloalkyl and substituted cycloalkyl groups containing 5 to 12 carbon atoms, and m is 1 when T is oxygen or sulfur, and 2 when T is nitrogen, to form a polymer having functional groups at the terminus of the arms and having the formula (Y)—[C—Z—T—(A—R$^1$R$^2$R$^3$)$_m$]$_2$ wherein:

Y represents a core derived by incorporation of at least one or a mixture of molecules having at least two independently polymerized vinyl groups;

C is a saturated or unsaturated block derived by anionic polymerization of at least one monomer selected from the group consisting of conjugated dienes, alkenylsubstituted aromatics, and mixtures thereof; and Z, T, A, R$^1$, R$^2$, R$^3$, and m are the same as defined above.

15. The process of claim 14, further comprising recovering the polymer after the functionalizing step.

16. The process of claim 14, further comprising removing at least one protecting group after forming the polymer to produce a functionalized telechelic polymer with at least one functional group per polymer chain.

17. The process of claim 16, further comprising after said removing step hydrogenating the telechelic polymer at a temperature between 25 and 150° C. to produce a saturated, functionalized telechelic polymer with at least one unprotected functional group per polymer chain.

18. The process of claim 14, further comprising:

hydrogenating the polymer at a temperature between 25 and 150° C. after forming the telechelic polymer; and removing at least one protecting group to produce a functionalized telechelic polymer with at least one unprotected functional group per polymer chain.

19. The process of claim 17, wherein the hydrogenation is continued until at least 90% of the aliphatic unsaturation has been saturated.

20. The process of claim 19, wherein the hydrogenation is continued until at least 95% of the aliphatic unsaturation has been saturated.

21. The process of claim 18, wherein the hydrogenation is continued until at least 90% of the aliphatic unsaturation has been saturated.

22. The process of claim 21, wherein the hydrogenation is continued until at least 95% of the aliphatic unsaturation has been saturated.

* * * * *

UNITED STATES PATENT AND TRADEMARK OFFICE
CERTIFICATE OF CORRECTION

PATENT NO. : 5,965,681

DATED : October 12, 1999

INVENTOR(S) : Schwindeman et al.

It is certified that error appears in the above-identified patent and that said Letters Patent is hereby corrected as shown below:

Title page, [56] References Cited, U.S. PATENT DOCUMENTS, line 7, "3,842,143" should read --3,842,146--.

Title page, in the firm name, "Alson" should read --Alston--.

Column 6, line 48, "$(A-R_1R\ ^2R^3)_m$" should read --$(A-R^1R^2R^3)_m$--.

Signed and Sealed this

Fourth Day of April, 2000

*Attest:*

*Attesting Officer*

Q. TODD DICKINSON

*Director of Patents and Trademarks*